Figure 1:
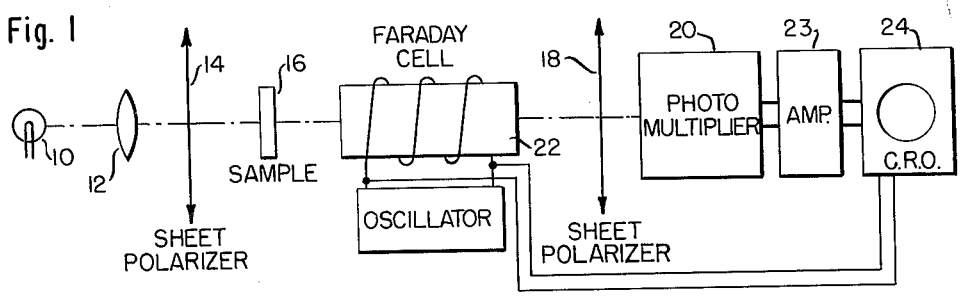

March 14, 1961   A. C. HARDY ET AL   2,974,561
POLARIMETER
Original Filed April 24, 1952

*INVENTORS*
ARTHUR C. HARDY
PAUL J. FOPIANO
MILTON B. TRAGESER
BY Kenway, Jenney, Witter & Hildreth
ATTORNEYS

2,974,561
POLARIMETER

Arthur C. Hardy, Wellesley, Paul J. Fopiano, Cambridge, and Milton B. Trageser, Waltham, Mass., assignors to Research Corporation, New York, N.Y., a corporation of New York Continuation of application Ser. No. 284,072, Apr. 24, 1952. This application Dec. 20, 1956, Ser. No. 630,433

9 Claims. (Cl. 88—14)

The present invention concerns the measurement of the optical rotary power of samples of liquids or solids for purposes of analysis, and relates more particularly to polarimetric apparatus by which the angle of optical rotation may be measured precisely.

This application is a continuation of our copending application Serial No. 284,072, filed April 24, 1952, and now abandoned.

A polarimeter determines the optical rotation due to a chemical sample by passing plane polarized light through the sample and determining the change in the angle of the plane of polarization which results. A typical instrument consists of a radiation source, usually a collimated monochromatic light beam, and two polarizing agents (Nicol prisms or sheets of light polarizing film) the first of which polarizes the light, while the second (the analyzer) determines the angle of the plane of polarization. In carrying out the measuring procedure, the plane of polarization is first determined with no sample in place, after which the sample to be tested is placed between the two polarizers and the rotation due to the sample is determined from the difference in the settings of the second polarizer. The setting is often determined by that position at which the least light from the first polarizer passes through the second.

When the sample is small or of low optical activity the rotation will be a small angle, frequently less than a circular degree. In order that the error be minimized it is therefore necessary that the angle of the plane of polarization be determinable with a very high degree of accuracy. While various photometric techniques have been adopted in an effort to improve the accuracy of measurement, they have for the most part been limited to improving the accuracy of measurement of the beam intensity. As a result, existing devices still do not provide the desired accuracy, and in addition they frequently require excessive care and time when accurate measurements are attempted.

It is therefore one of the objects of this invention to provide a novel apparatus for determining polarimetric measurements with high precision.

More specifically, it is an object of the invention to provide a polarimeter wherein the angle of optical rotation may be determined by reference to information superimposed on the light beam.

In accordance with the above objects, the invention involves, as a feature thereof, polarimetric apparatus wherein the light beam is modulated in a manner which enables the null setting of the prisms to be ascertained by reference to the modulating signal rather than in terms of the intensity of the light beam. More specifically, the arrangement is such that the setting is determined with high precision by phase sensitive or other sensitive means.

Figure 2:
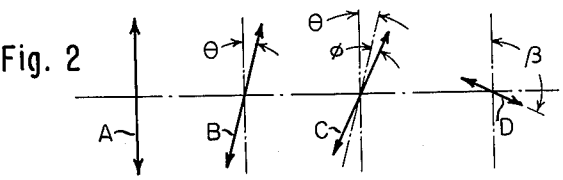
Figure 3:
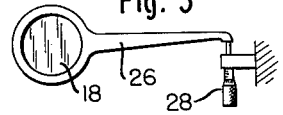
Figure 4:
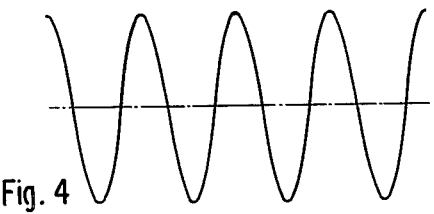
Figure 5:
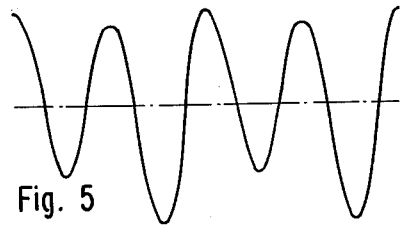
Figure 6:
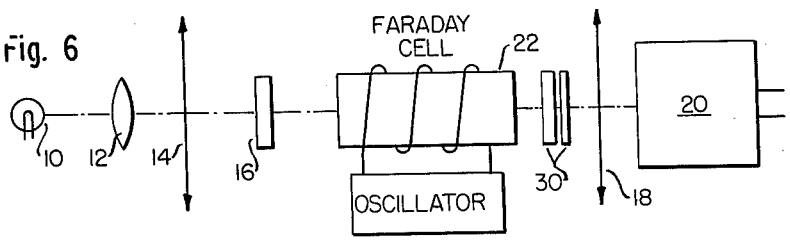
Figure 7:
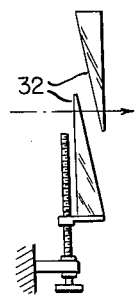
Figure 9:
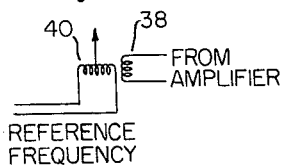
Figure 8:
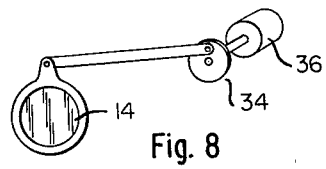

In the drawings illustrating the invention,
Fig. 1 is a schematic representation of the apparatus;
Fig. 2 is a diagram explanatory of the theory;
Fig. 3 is a view of a detail of the apparatus;
Fig. 4 shows the type of waveform produced at null position of the second polarizer;
Fig. 5 shows typical waveforms when the apparatus has not been set precisely at the null position;
Fig. 6 is a diagram of a modification of the invention;
Fig. 7 is a detail of a further modification;
Fig. 8 shows a modified oscillating device; and
Fig. 9 shows alternative apparatus for determining the zero position.

Referring to Fig. 1, the invention employs certain conventional components common to all polarimeters. A monochromatic light source 10 and a collimating lens system 12 produce a light beam that is directed through the polarizer 14. The polarizing element may consist of a Nicol prism or a suitably mounted sheet of polarizing material. The polarizer 14 produces a plane polarized beam which is passed through the sample 16 and the second polarizer (analyzer) 18 to detecting means represented by the photomultiplier 20. The analyzer is mounted for precise rotational movement with a calibrated scale.

Instead of relying on the determination of the minimum light intensity to ascertain the angular setting of the analyzer 18, however, the present invention contemplates the use of an angularily modulated light beam together with detecting means of high precision for analyzing the relationship between the modulated beam and the second polarizer. Modulation of the light beam is advantageously produced by a Faraday cell 22 disposed between the sample and the analyzer, the cell being energized to oscillate the angle of the plane of polarization periodically with time. The Faraday cell itself is a cylindrical tank or vessel containing suitable homogeneous transparent material and surrounded by a solenoid excited by an alternating current. In the illustrated embodiment of the apparatus an audio oscillator supplies an A.C. signal to an amplifier, which in turn supplies current to a tuned circuit containing the coil of the Faraday cell as the inductive component. The beam of light having an oscillating plane of polarization then passes through and is modified by the second polarizer, after which the resulting light signal is sensed by the photomultiplier. The output of the photomultiplier, characterized by the influence of the light signal, is fed to a suitable amplifier 23 tuned to the exciting frequency, and hence designed to attenuate frequencies other than the exciting frequency, particularly those harmonics which may be produced, as will be presently described.

The resultant signal in this example is displayed on a cathode ray oscilloscope 24, the signal from the amplifier output being applied to the vertical plates and the horizontal sweep signal being synchronized with the exciting frequency of the Faraday cell.

As described above, the invention consists of a polarimeter in which the second (analyzing) polarizer sees and intercepts a beam which has been rotated by the sample and which, as a result of the modulation imparted by the Faraday cell, oscillates about a midpoint corresponding to the plane of polarization without modulation of the light beam. The resultant signal detected by the phototube and displayed by the oscilloscope is of a character that clearly reveals even slight departures from the correct null setting of the second polarizer.

The operation of the apparatus is described by reference to the diagram of Fig. 2. Let the axis of polarization of the light from the polarizer 14 be represented by the vertical line A. (It will first be assumed that the polarizer 14 is ideal and transmits no light in any plane other than that represented by A.) Let E represent the amplitude of the component of the original light which is in the direction A; then if $k$ is the transmission constant of the polarizer 14, the amplitude of the polarized light is $kE$. If the same rotates the plane of polarization by the angle $\theta$, the light from the cell is represented by B, of amplitude $kE$ (assuming no attenuation in the cell) and at an angle $\theta$. The Faraday cell is excited at an angular frequency $\omega$, and the plane of polarization is further rotated by an angle $\varphi$, which is a sinusoidally varying angle.

$$\varphi = a \sin \omega t$$

In other words $\varphi$ represents the "wobble" of the plane of polarization due to sinusoidal excitation of the cell at an angular frequency $\omega$. $a$ is the amplitude of the wobble, namely, the amplitude of the angle through which the plane is oscillated by the Faraday cell, and is a function of the optical properties of the cell. Therefore the light leaving the Faraday cell is of an amplitude $kE$ at an angle of $\theta + \varphi$ and is respesented by C.

The analyzer 18 has its axis D at an angle $\beta$ to the axis A, and therefore transmits only that component of C which lies along D. The emergent light falling on the photomultiplier 20 has an amplitude $k^2E \cos(\theta + \varphi - \beta)$ at an angle $\beta$.

The intensity of the emergent light is $$J_p = K k^4 E^2 \cos^2(\theta + \varphi - \beta)$$

where K is a constant. Since the intensity of the natural light incident on the polarizer 14 is $$J_o = 2KE^2$$

the ratio of the emergent to incident light is $$R = \frac{J_p}{J_o} = \tfrac{1}{2} k^4 \cos^2(\theta + \varphi - \beta)$$

Since $\varphi$ is a sinusoidally varying angle, this ratio is periodic. It has a constant component, a fundamental or first harmonic of angular frequency $\omega$, a second harmonic $2\omega$, and higher harmonics. The uniform and first two alternating components can be shown to be:

Constant component:

$$R_0 = \tfrac{1}{4} k^4 (1 - a^2 + a^4)[1 + \cos 2(\theta - \beta)]$$

First harmonic component:

$$R_1 = \tfrac{1}{4} k^4 (2a - a^3 + \tfrac{1}{6} a^5) \sin 2(\theta - \beta) \sin \omega t$$

Second harmonic component:

$$R_2 = \tfrac{1}{4} k^4 (a^2 - \tfrac{1}{3} a^4) \cos 2(\theta - \beta) \cos 2\omega t$$

where powers of $a$ higher than the fifth have been neglected. In the amplifier the uniform or direct current component is rejected. The measurement is effected by nulling $R_1$, which can be done by making $\theta - \beta = 0$.

To make a measurement the analyzer 18 is first set for zero first harmonic output with no sample in place, then the sample is introduced and the analyzer reset for zero first harmonic electrical output, whence $\theta$ is the difference of the two angular readings. The actual determination of the null may be carried out by observing the trace displayed on the oscilloscope. With a linear sweep, only the second harmonic appears, when the fundamental is nulled, and the waveform is as shown in Fig. 4, with uniform peaks, while if the fundamental is not nulled, the peaks will vary in magnitude, as shown in Fig. 5. These forms are for a second-harmonic amplitude several times that of the fundamental frequency. The waveform is extremely sensitive to the position of the setting of the analyzer when it is near the null point, and it has been found that a motion of the order of one second of arc is sufficient to effect a distinguishable change in waveform. If desired the sweep circuit of the oscilloscope may be excited to give Lissajous diagrams, which likewise present sufficient distinguishing characteristics in the neighborhood of the null point.

Other and in some respects preferable methods of determining the first harmonic null may be used, dependent on complete elimination of the effect of other frequencies, or on phase shifts in the neighborhood of the null point. One convenient form of apparatus utilizes a dynamometer, as shown in Fig. 9, having one coil 38 energized from the output of the amplifier 23, while the other coil 40 is excited at the reference frequency $\omega$, namely, the frequency of the wobble imparted to the Faraday cell. The indicating hand will give a sensitive zero indication. From the theory herein presented, it can be shown that the fundamental undergoes a 180° shift in phase when passing through the null, hence the indicating hand will undergo a detectable shift in position when the term in $R_1$ passes through zero. This also indicates which side of null the setting is on at any time, so that the operator can see in which direction to proceed toward the null.

If desired, the dynamometer may be calibrated in terms of angle, whereby the deflection from zero gives an accurate reading of the angle. By the use of blocks 30 or wedges 32 the dynamometer may be brought to an initial, preferably zero or near zero, reading with no sample in place, and a second electrical reading with the sample in place may then be taken, whereby the optical activity will then be given by the difference in readings. This avoids the necessity of accurate mechanical adjustments, and also allows the apparatus to be used in connection with recording or control equipment.

The foregoing assumes ideal polarizers, and ideal Faraday cell and ideal electrical circuits. Actually, a polarizer transmits some light in the plane perpendicular to its plane of polarization. It can be shown that this directly affects only the constant or D.C. component, and hence does not influence the result; in this respect the invention is preferable to methods which depend on D.C. measurements. Noise arises mainly from shot noise in the electronic circuits. A high "signal-to-noise" ratio is desired. The presence of noise tends to distort the waveform so that the null waveform may not exhibit uniform peaks, as in Fig. 4, but it has been found that disturbing factors can be made practically negligible, and the null can be readily determined. From a theoretical consideration, it can be shown that $a$, the wobble angle, has an optimum value, which produces the maximum signal-to-noise ratio under given conditions. It is approximately as follows:

$$a_{op} = \frac{2\tau}{k^2}$$

where $\tau$ is the proportion of the incident light that is passed by the system due to imperfect polarization of the beam. Since $\tau$ is small with good polarizers, the angle $a$ is preferably small, usually of the order of 0.02 radian (about one degree).

The wobble frequency $\omega$ is chosen for convenience. It preferably differs from commercial power frequencies, in order to avoid extraneous inductive effects. A frequency of 400 to 1000 c.p.s. has been found satisfactory.

The oscillation or wobble of the plane of rotation of the light may alternatively be performed by mechanically oscillating the polarizer 14, by such means as indicated in Fig. 8, comprising a crank 34 connected with the polarizer mount and driven by a motor 36. The Faraday cell is preferable, however, because it inherently possesses what might be termed a natural zero, since if the current is switched off the cell has no effect.

In making a measurement, therefore, the angular settings of the analyzer 18 are determined for two conditions; first, a null with the sample removed (or replaced by material known to be optically inactive), and second, a null with the sample in place. The optical rotary power of the sample is simply the difference of the two settings.

For the purpose of reading the settings of the analyzer, an accurate angular measurement is required. This is conveniently afforded by mounting the analyzer in a long arm 26, having its end connected with an accurate tangent-screw device, shown as a conventional micrometer 28. With this apparatus, settings to a precision of about one second of arc may be attained.

Another procedure of measurement, which avoids the necessity of making actual angular readings is to insert into the path of the beam calibrated blocks 30 of quartz or other optically active material, having a rotary effect opposite to that of the sample. Thus, the analyzer 18 is adjusted for a null without the sample or blocks in place; then the sample is inserted and a number of blocks are also inserted until the null is restored. The optical power of the sample is then the same as the known power of the blocks, but in the opposite direction.

Instead of the blocks 30, adjustable calibrated wedges of optically active materials, may be used as shown at 32 in Fig. 7.

The invention, because of its exceptional sensitivity, is particularly suitable for measuring the rotary power of small samples. The conventional polarimeter uses a sample 20 cm. long. The present invention allows accurate measurements to be made on samples which may not be more than 2 mm. long. Thus, it is possible to determine the optical properties of biological fluids, such as blood or humors, which are obtainable only in small quantities or are too opaque for passage of light through a long column. The apparatus may also be used on samples of considerable length, in which case the measurements may be made with exceptional percentage accuracy.

Having thus described the invention, we claim:

1. In a polarimeter which includes a light source, means for polarizing the light from said source, and an analyzer having an axis of polarization, the improvement that comprises means for accurately determining a position for said analyzer such that the average value of the direction of the plane of polarization of light incident thereon is at right angles to said analyzer axis comprising, in combination, a Faraday cell interposed between said polarizing means and said analyzer, means providing a first periodically oscillating electrical signal to energize said Faraday cell and thereby periodically vary the plane of polarization of light falling on said analyzer, photoelectric means for generating a second electrical signal, said photoelectric means being located such that said photoelectric means are responsive to the periodically varying light passed by said analyzer, means for measuring the amplitude and relative phase of an electrical signal supplied thereto, means applying said first electrical signal to said measuring means, and means applying said second electrical signal to said measuring means whereby the amplitude of the first harmonic content of said second electrical signal and the relative phase of said first and second electrical signal may be measured and means for adjusting the angle between the direction of the plane of polarization of light incident on said analyzer and said analyzer axis such that said first harmonic signal is a minimum.

2. The combination defined in claim 1 in which said measuring means is a cathode ray oscilloscope.

3. The combination defined in claim 1 in which said measuring means is a dynamometer.

4. The combination defined in claim 1 in which said means for adjusting the angle between the direction of the plane of polarization of light incident on said analyzer and said analyzer axis includes means for rotating said analyzer.

5. The combination defined in claim 1 in which said means for adjusting the angle between the direction of the plane of polarization of light incident on said analyzer and said analyzer axis includes means interposed between said polarizer and said analyzer for adjustably rotating the plane of polarization of light passed by said polarizer.

6. The combination defined in claim 5 in which said rotating means comprises a plurality of quartz blocks.

7. The combination defined in claim 5 in which said rotating means comprises a pair of wedges of optically active material having overlapping tapering end portions, the amount of overlap of said end portions being adjustable to thereby adjustably rotate said plane of polarization.

8. The combination defined in claim 1 which includes an amplifier for applying said second electrical signal to said measuring means, said amplifier being tuned to the frequency of said first periodically oscillating electrical signal.

9. The combination defined in claim 1 wherein the amplitude of the variation in the plane of polarization of said light falling on said analyzer is approximately equal to $$\frac{2\tau}{k_1 k_2}$$

$\tau$ being the proportion of incident light from said light source passed to said photoelectric means when said analyzer axis is at right angles to the plane of polarization of said means for polarizing the light from said source, $k_1$ is the transmission constant of said polarizing means and $k_2$ is the transmission constant of said analyzer.

References Cited in the file of this patent

UNITED STATES PATENTS

| 2,418,964 | Arenberg | Apr. 15, 1947 |
| 2,829,555 | Keston | Apr. 8, 1958 |

FOREIGN PATENTS

| 540,876 | Great Britain | Nov. 4, 1941 |